United States Patent

Proakis

[15] 3,657,669

[45] Apr. 18, 1972

[54] FREQUENCY DOMAIN ADAPTIVE EQUALIZER

[72] Inventor: John G. Proakis, Waltham, Mass.

[73] Assignee: GTE Laboratories Incorporated

[22] Filed: Sept. 2, 1970

[21] Appl. No.: 68,897

[52] U.S. Cl. .............................333/18, 178/69 R, 328/167, 333/70 T

[51] Int. Cl. .............................H04b 3/04

[58] Field of Search .......................333/16, 18, 70 T; 325/42; 178/69 R; 328/167

[56] References Cited

UNITED STATES PATENTS 3,479,458 11/1969 Lord et al. ...........................333/18 X 3,573,667 4/1971 Kao et al.................................333/18

*Primary Examiner*—Paul L. Gensler

*Attorney*—Irving M. Kriegsman

[57] ABSTRACT

A frequency domain adaptive equalizer employs a first filter, having a plurality of periodically spaced zeros in its transfer characteristics, coupled to a second filter that includes a plurality of tuned circuits, each circuit having two poles in its transfer characteristics. The two filters are designed such that each of the zeros of the first filter are coincident with the poles of a separate tuned circuit of the second filter. Associated with each tuned circuit is a compensation circuit coupled to a summation circuit which combines the output signals of all of the compensation circuits to form a composite signal. A comparator circuit compares the composite signal thus generated with a stored reference signal to generate an error signal which is directed back to the compensation circuits to automatically adjust its parameters such that the error signal is minimized.

10 Claims, 4 Drawing Figures

INVENTOR
JOHN G. PROAKIS
BY
Robert T. Orner
ATTORNEY

INVENTOR
JOHN G. PROAKIS
BY
Robert T. Orner
ATTORNEY

FREQUENCY DOMAIN ADAPTIVE EQUALIZER

BACKGROUND OF THE INVENTION

This invention relates to adaptive equalizer apparatus, in particular to frequency domain adaptive equalizers useful in transmission and communication channels which possess nonideal frequency response characteristics.

An ideal communication channel is one that has a flat amplitude response and a linear phase response for all frequencies occupied by a transmitted signal being propagated within the channel. Most physical channels have responses that differ considerably from the ideal frequency response. As a result, signals transmitted through such channels may be distorted considerably. Thus, in practice some means must be provided for correcting the distortion caused by response characteristics of the communication channel.

A network having some adjustable circuit elements may be placed in cascade with the communication channel for the purpose of providing the necessary compensation for the channel distortion. This network is often called an equalizer because, when placed in cascade with the channel, it attempts to undo or compensation for the channel distortion and thus to yield equal attenuation and delay values (linear phase) to all frequencies occupied by the signal. When the equalizing network is connected to a communication channel such as a telephone line, test signals are transmitted through the channel-network combination, and the parameters of the network adjusted to provide the necessary compensation. This adjustment is usually performed manually and requires some test equipment. As the channel characteristic change with time, the equalizer network must be readjusted. In general, this adjustment procedure proves to be time-consuming and costly. In particular, the cost of providing equalization of channels in the switched telephone network becomes prohibitive.

It is, therefore, one of the objects of this invention to provide at the receiving terminal of a communication system an equalizing network having adjustable circuit parameters and means for adjusting the circuit parameters automatically.

SUMMARY OF THE INVENTION

A frequency domain adaptive equalizer according to the present invention includes a first filter means, such as a comb filter, having a plurality of periodically spaced zeros in its transfer function coupled to a second filter means including a plurality of tuned circuits. Each of the tuned circuits has in its transfer characteristics a predetermined number of poles which are coincident in the frequency domain with a separate one of the zeros of the first filter means. Each one of a plurality of compensation means has its input coupled to a separate one of the plurality of tuned circuits, its output connection coupled to a common summation circuit, and includes a control terminal and is operative in response to a predetermined signal at its control terminal to change the transfer characteristics of the tuned circuit/compensation circuit combination. The summation means sums the output signals from the plurality of compensation means to form a composite signal.

A feedback means has an input connection coupled to the output connection of the summation means, an output connection coupled to the control terminal of each of the pluralities of compensation means, and a source of reference signals and is operative to generate the predetermined signal at its output connection. The predetermined signal is proportional to the difference between a reference signal from the reference signal source and a signal at the input connection of the feedback means.

A predetermined test signal that has been transmitted along a phase and/or amplitude distorted transmission path enters the first filter means. The test signal is separated into a plurality of frequency dispersed signals by the combined action of first and second filter means, and each frequency signal is directed through the plurality of compensation means to the first summation circuit where a composite signal is formed. By comparing the composite signal with a signal from the source of reference signals, the feedback means generates an error signal which adjusts the parameters of the compensation circuit in a direction to minimize the error signal.

BRIEF DESCRIPTION OF THE DRAWINGS

The construction and operation of a frequency domain adaptive equalizer according to the present invention will be more fully understood from the following detailed description taken in conjunction with the accompanying drawings in which.

DETAILED DESCRIPTION OF THE INVENTION

Figure 1:
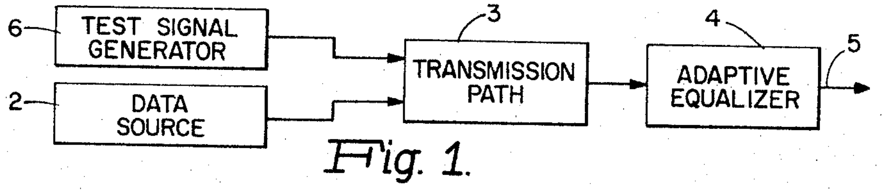
FIG. 1 is a block diagram of a transmission system.

A signal transmission system is shown in FIG. 1 and includes a data source 2, such as a telephone subscriber, coupled to a transmission path 3, such as a telephone transmission line, the output connection of which is coupled to an adaptive equalizer 4 having an output terminal 5. A second input connection to the transmission path 3 originates at a test signal generator 6 which generates a plurality of discrete frequency signals spaced in frequency across the band of interest.

In operation, a test signal is generated by the test signal generator 6 and propagated along the transmission path 3 (where amplitude and/or phase distortions occur) to the adaptive equalizer 4. The adaptive equalizer 4 senses the amount of the amplitude and/or phase distortion in the test signal and adjusts its amplitude and/or phase characteristics in a direction to minimize the distortion of the test signal at the output terminal 5 of the adaptive equalizer 4. By adjusting the characteristics of the adaptive equalizer, signals from the data source 2 are directed through the combination of the transmission path 3 and the adaptive equalizer 4 with minimum distortion.

Figure 2:
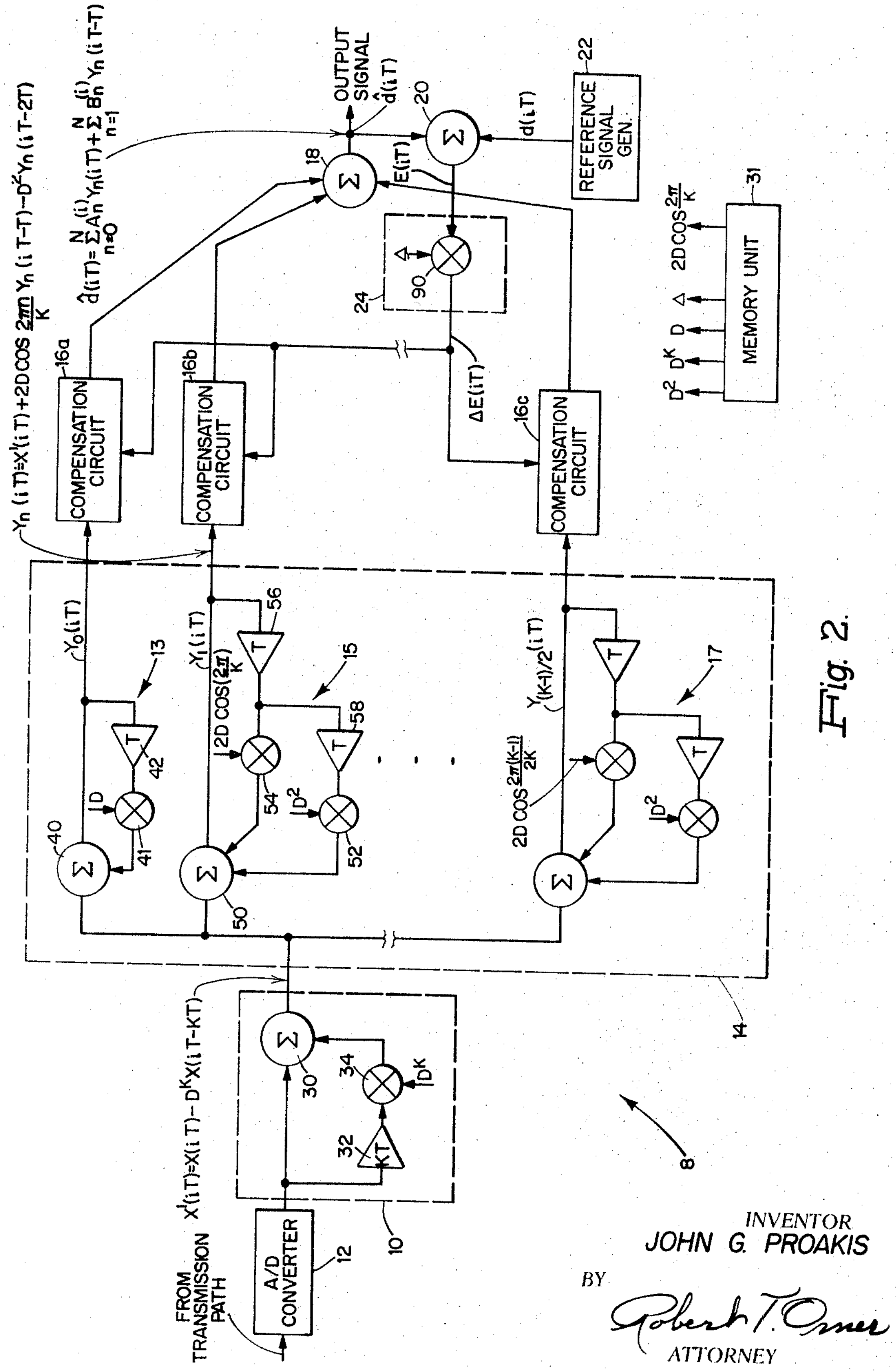
FIG. 2 is a block diagram of an embodiment of a frequency domain adaptive equalizer according to the invention employed in the transmission system of FIG. 1.

An embodiment of a frequency domain adaptive equalizer 8 according to the invention is shown in FIG. 2 and includes a first filter section 10 having an input connection connected to an A/D converter 12 and an output connection coupled to a second filter section 14 including a plurality of tuned circuits 13, 15 and 17, each tuned circuit having two poles coincident in frequency with the zeros of the first filter section. The number of tuned circuits (three of which are shown by way of example) employed is proportional to the number of zeros in the first filter 10. Coupled to each of the plurality of tuned circuits is one of a plurality of compensation circuits 16, the output connections of which are coupled to a first summation circuit 18. A comparator circuit, such as a second summation circuit 20, has input connections from the first summation circuit 18 and a reference signal generator 22 and an output connection coupled through an attenuator circuit 24 back to each of the plurality of compensation circuits 16.

Before discussing the details of the adaptive equalizer components, a brief mathematical description of the adaptive equalizer 8 will be given. The frequency transfer characteristics of the adaptive equalizer according to the present invention are described by the $z$-transform of the impulse response as shown in Equations (1A) and (1B).

$$G(z)=(1-D^{K}z^{-K})\left\{\frac{A_0}{1-Dz^{-1}}+\sum_{n=1}^{\frac{K-1}{2}}\left[\frac{A_n+B_nz^{-1}}{1-2D\cos\frac{2\pi n}{K}z^{-1}+D^2z^{-2}}\right]\right\};\ K\text{ odd integer}\qquad(1A)$$

$$G(z)=(1-D^{K}z^{-K})\left\{\frac{A_0}{1-Dz^{-1}}+\frac{A_{K/2}}{1+Dz^{-1}}+\sum_{n=1}^{\frac{K-1}{2}}\frac{A_n+B_nz^{-1}}{1-2D\cos\frac{2\pi n}{K}z^{-1}+D^2z^{-2}}\right\};\ K\text{ even integer}\qquad(1B)$$

where K is the number of adjustable filter parameters (also the number of zeros in the first filter 10 or the number of poles in second filter 14), D is a damping factor that ensures stability in the filter, $z$ is analogous to frequency and is defined as $z = e^{j2\ ft}$, where $f$ denotes the frequency and $T$ is the sampling interval of the A/D converter, $n$ is the index in the summation of Equation (1), $A_n$ is an adjustable parameter of the $n^{th}$ compensation circuit, $B_n$ is an adjustable parameter of the $n^{th}$ compensation circuit.

Equations (1A) and (1B) describe the transfer characteristics of the frequency domain adaptive equalizer where K is an odd and even integer respectively. The apparatus for Equation (1A) is discussed in detail with the appropriate modifications noted for Equation (1B).

The first filter section 10 has the transfer function in the z-plane $$H(z) = 1 - D^K z^{-K} \quad (2)$$

which is the first term in Equation (1A). Equation (2) can be factored as follows:

$$H(z) = \prod_{n=0}^{K-1} [1 - De^{j2\pi n/K} z^{-1}], \quad (3)$$

where $\Pi$ is the product of the K terms $(1 - D_e^{j2\pi n/K} z^{-1})$ $n = 0, 1, \ldots, K-1$. Thus the zeros of $H(z)$ are at $$z = De^{j2\pi n/K}, n = 0, 1, \ldots, K-1.$$

The combination of any of the tuned circuits of the second filter section 14 and the corresponding compensation circuit 16 have the transfer function $$H_n(z) = \frac{A_n + B_n z^{-1}}{1 - 2D\left(\cos\frac{2\pi n}{K}\right) z^{-1} + D^2 z^{-2}} \quad (4)$$

The denominator of Equation (4) can be factored as follows:

$$H_n(z) = \frac{A_n + B_n z^{-1}}{(1 - De^{j2\pi n/K} z^{-1})\ (1 - De^{-2\pi n(K-n)/K} z^{-1})} \quad (5)$$

As is seen from Equations (3) and (5), two poles of the second filter section 14 coincide with two of the zeros of the first filter section 10. Thus, if the filter section 10, as represented by H($z$) of Equation (3), is coupled in a cascade arrangement to any of the tuned circuits of the second filter section 14 as represented by $H_n(z)$ of Equation (5), the two poles of the second filter section 14 cancel two of the zeros of the first section 10. Since $z = e^{j2\ ft}$, the zeros of the first filter section 10 and the poles of the second filter section 14 occur at the frequencies $$f_n = n/KT, n = 0, 1, \ldots, K-1.$$

Figure 4:
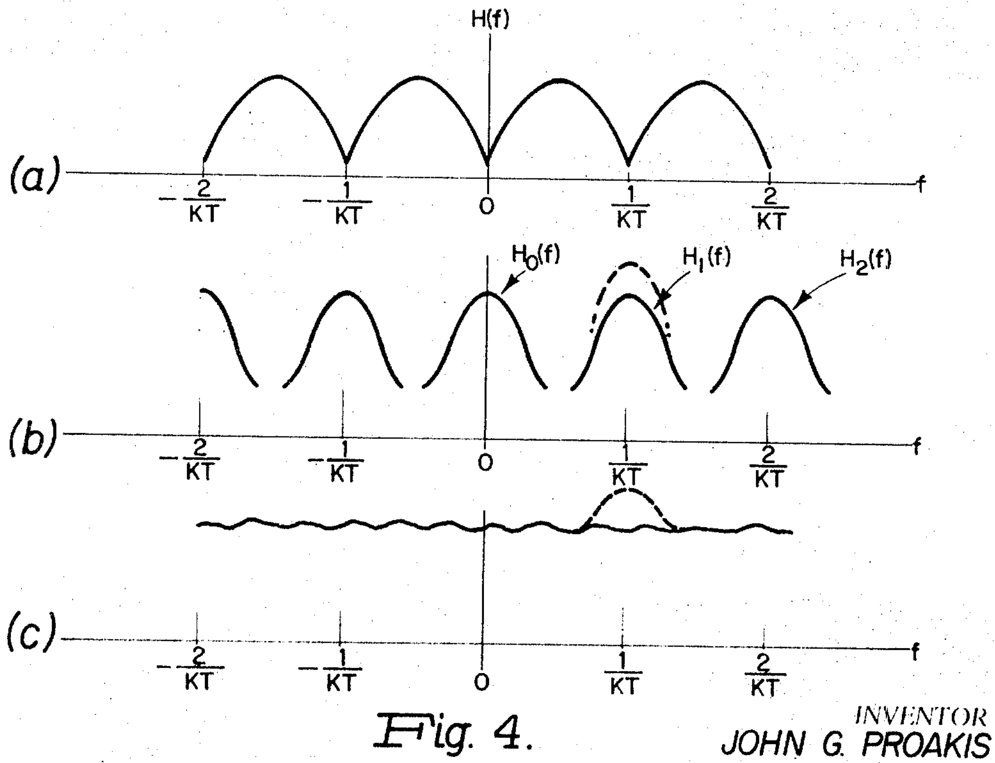
FIG. 4 is a series of waveforms useful in explaining the operation of the adaptive equalizer of FIG. 2.

Shown in waveshape (a) of FIG. 4 is a sketch of the transfer characteristics of the first filter section 10 including the zeros at multiples of 1/KT. Shown in waveshape ($b$) of FIG. 4 is a sketch of the transfer function for the combination of the second filter section 14 and the compensation circuits 16. The transfer characteristics of the adaptive equalizer 8 is the combination of the transfer characteristics of the first and second filter sections as sketched in waveshape ($c$) of FIG. 4.

Assume, by way of example, that the transmission path over which the test signal is being propagated has an attenuation at the frequency $1/KT$. The test signal frequency component at $f = 1/KT$ is directed through to the comparator circuit 20 via the tuned circuit 15 (which in the instant example is tuned to the $1/KT$ frequency), the associated compensation network **16*b* and the summation circuit 18. The comparator circuit 20 compares the test signal to a reference signal from the reference signal generator 22 and generates an error signal which is directed back to the compensation network 16b to increase the circuit gain and thereby compensate for the attenuation of the transmission path. The dashed portions of waveshapes ($b$) and ($c$) show the change in the transfer characteristics of the combination of the tuned circuit 15 and compensation circuit 16b and the adaptive equalizer 8** respectively.

The numerator of Equation (5) includes the adjustable parameters $A_n$ and $B_n$ of the compensation circuits 16 and can be expressed in the frequency domain as follows $$N_n(\omega) = A_n + B_n \cos\omega T - jB_n \sin\omega T \quad (6)$$

where $\omega$ is the radian frequency, i.e., $\omega = 2\ f$. The magnitude of the numerator $N_n(\omega)$ which compensates for amplitude distortions in the transmission path is a function of $A_n$ and $B_n$ as seen in Equation (7).

$$|N_n(\omega)| = \sqrt{(A_n + B_n \cos\omega T)^2 + B_n^{(2)} \sin^2\omega T} \quad (7)$$

The phase of the numerator $N_n(\omega)$ which compensates for phase distortions in the transmission path is also a function of the adjustable parameters $A_n$ and $B_n$ as can be seen by Equation (8).

$$\theta_n(\omega) = \tan^{-1} \frac{-B_n \sin\omega T}{A_n + B_n \cos\omega T} \quad (8)$$

Therefore, by adjusting the parameters $A_n$ and $B_n$ of Equations (7) and (8) in the compensation circuits 16, the amplitude and phase characteristics of the adaptive equalizer 8 can be adjusted to compensate for amplitude and/or phase distortions that are present in the transmission path between a transmitting terminal and a remote receiving terminal.

FIRST FILTER SECTION

An embodiment of a filter having a plurality of periodically spaced zeros in its transfer characteristics is shown in FIG. 2 and includes a summation circuit 30 and a delay circuit 32 (such as a shift register), both of which have input connections coupled to the output connection of the A/D converter 12. A multiplier circuit 34 has an input connection connected to the delay circuit 32 and an output connection connected to a second input connection of the summation circuit 30, the output connection of which is coupled to the tuned circuits of the second filter section 14.

The transfer function of the first filter section 10 is described in Equation (2) and can be rewritten in the frequency domain as $$H(\omega) = [1 - (\cos\omega KT + j\sin\omega KT)\ D^K] \quad (9)$$

The output signal of the first filter section then is simply the present input signal minus the input signal delayed by $KT$ seconds and attenuated by $D^K$ where $D$ is a damping factor and $T$ is a time interval of unit delay (also, the sampling interval of A/D converter) which is chosen to be approximately twice the highest frequency in the frequency band of the transmission path. For example, in telephone line applications involving the 4 kHz. voice channel, the highest frequency is in the range of 3,000 to 4,000 Hz. and, hence, $T$ may be chosen as any value in the range 1/8,000 $T$ 1/6000. The damping factor D is a predetermined number (near one) stored in a memory unit 31 (well-known in the art) and supplied to the multiplier circuit 34 on demand. The damping factor D employed to insure the stability of the first filter section 10 may have a value, for example, equal to $1-2^{-12}$ for a telephone line equalizer employing a 12 bit word.

Once the value of $T$ is chosen, the value of $K$ (a positive integer) determines both the frequency separation between successive zeros in the frequency response of the first filter section 10, which is $1/KT$, and the number of parallel tuned circuits and compensation networks in the second filter section 14. In practice, typical values of $K$ may range from 10 to 50.

SECOND FILTER SECTION

As stated hereinabove, the second filter 14 includes a plurality of tuned circuits, three of which are shown in FIG. 1 and the number of which depends upon the value of $K$. The combination of the tuned circuits 13, 15 and 17, compensation circuits **16*a*, 16*b* and 16*c* and the summation circuit 18 has a transfer function described by the portion of Equation (1) within the brackets. The first term within the brackets defines the DC term and is processed by the compensation circuit 16*a* and the first tuned circuit 13. The first tuned circuit 13 includes a summation circuit 40 having input connections from the first filter section 10 and a multiplier circuit 41 and output connections to the compensation circuit 16*a* (which supplies the $A_0$ term in a manner to be discussed later) and a delay circuit 42. The multiplier circuit 41 has first and second input connections from the memory unit 31 and the delay circuit 42 respectively. Essentially an input signal at the summation circuit 40 is added vectorially to the previous input signal which has been delayed for a time $T$ by the delay circuit 42 and multiplied by the factor D in the multiplier circuit 41. The resultant signal is then directed to the compensation circuit 16*a***.

The remaining tuned circuits 15 through 17 are tuned to discrete frequencies from $f=1/KT$ up to $f=(K-1)/2KT$ for $K$ odd and up to $F=(K-2)/2KT$ for $K$ even and distributed across the band of interest. The frequency separation is $1/KT$. In terms of apparatus, the remaining tuned circuits are similar and therefore only the operation of tuned filter 15 will be discussed in detail. Tuned circuit 15 includes a summation circuit 50 having input connections coupled to the first filter section 10, a first multiplier circuit 52 and a second multiplier circuit 54 and an output connection coupled to the compensation circuit **16*b* and a first delay circuit 56. The first delay circuit 56 has an output connection coupled to the second multiplier circuit 54 and to a second delay circuit 58, the output connection of which is coupled to the first multiplier circuit 52. Coupled to the first and second multiplier circuits 52 and 54 from the memory unit 31** are signals representing the respective constants $D^2$ and $2D\cos 2\pi/K$.

The required transfer function of the tuned circuits is given in the denominator of the term on the right-hand side in Equation (4) with $n=1$. To satisfy the equation, a present input signal at the summation circuit 50 is added to the previous sample of the output signal denoted as $Y_1(iT)$ and also to the sample of the output signal processed two time intervals before, denoted as $Y_1(iT-T)$. Prior to the summation with the present input sample, the previous output sample has been directed through the delay circuit 56 where it was delayed one sample interval and through the second multiplier circuit 54 where it was multiplied by the factor $$2D\cos\left(\frac{2\pi}{K}\right).$$

. The combination of the delay circuit 56 and the second multiplier circuit 54 corresponds to the function described in the second term in the denominator of Equation (4).

The third input signal to the summation circuit 50 is a sample of the output signal which has been delayed for two sample intervals by the series-connected delay circuits 56 and 58 and the first multiplier circuit 52 corresponds to the third term in the denominator of the term in Equation (4).

COMPENSATION CIRCUIT

Figure 3:
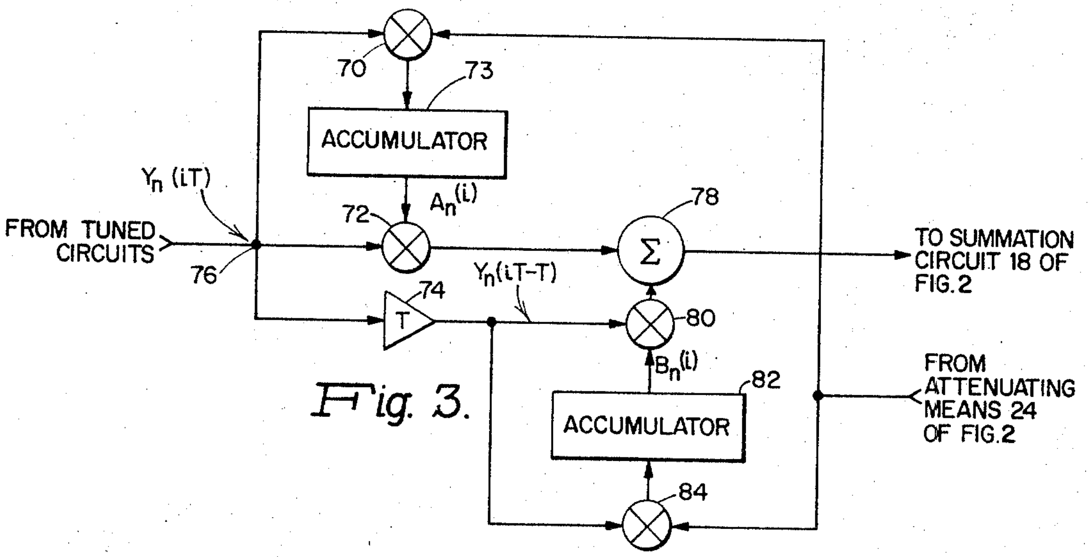
FIG. 3 is a block diagram of an embodiment of a compensation circuit employed in the adaptive equalizer of FIG. 2.

An embodiment of a compensation circuit is shown in FIG. 3 and includes a first multiplier circuit 70, a second multiplier circuit 72 and a delay circuit 74 having a common juncture 76 coupled to the associated tuned circuit of the second filter section 14. A first accumulator circuit (well-known in the art) is connected between the output connection of the first multiplier circuit 70 and a second input connection of the second multiplier circuit 72, the output connection of which is connected to a summation circuit 78. The summation circuit 78 has an output connection coupled to the summation circuit 18 of FIG. 2 and a second input connection from the output connection of a third multiplier circuit 80 which has input connections from the delay circuit 74 and a second accumulator circuit 82. A fourth multiplier circuit 84 has an output connection connected to the second accumulator circuit 82 and an input connection connected to the common juncture of the delay circuit 74 and the third multiplier circuit 80. Coupled to a second input connection on the first and second multiplier circuits 70 and 84 is the output connection of the attenuator circuit 24 of FIG. 2.

The following is a description of the sequence of operations in the compensation circuit. An input signal, denoted by $Y_n(iT)$, at the terminal 76 of the compensation circuit of FIG. 4 is directed to the first multiplier circuit 72 where it is multiplied by the signal $A_n^{(i)}$ of accumulator 73 to form the product signal $A_n^{(i)}Y_n(iT)$. Simultaneously, the previous input signal, denoted as $Y_n(n\,T-T)$, which appears at the output of delay circuit 74, is directed to multiplier circuit 80 where it is multiplied by the signal $B_n^{(i)}$ of accumulator 82 to form the product signal $B_n^{(i)}Y_n(iT-T)$. The product signals $A_n^{(i)}Y_n(iT)$ and $B_n^{(i)}Y_n(iT-T)$ are summed in the summation circuit 78 to form the output of the compensation circuit. This output is then directed to the summation circuit 18 of FIG. 2.

The output of the summation circuit 18 constitutes the output signal, denoted by $\hat{d}(iT)$, which is compared with the output of the reference signal generator 22 in comparator (summation) circuit 20 of FIG. 2, to yield an error signal, denoted by $E(iT)$, which is then attenuated by the attenuating circuit 24. This attenuated error signal, denoted by $\Delta E(iT)$, is used to adjust the parameters $A_n^{(i)}$ and $B_n^{(i)}$ of the compensation circuit by the following procedure. The attenuated error signal is directed simultaneously to multiplier circuits 70 and 84. The other input to multiplier circuit 70 is signal $Y_n(iT)$, and the output of multiplier circuit 70 is $\Delta E(iT)Y_n(iT)$. The second input to multiplier circuit 84 is the delayed signal $Y_n(iT-T)$ of the output of delay circuit 74. Thus, the product signal at the output of multiplier circuit 84 is $\Delta E(iT)Y_n(iT-T)$. The resultant product signals $\Delta E(iT)Y_n(iT)$ and $\Delta E(iT)Y_n(iT-T)$ at the outputs of the multiplier circuits 70 and 84 are added into the respective accumulators 73 and 82 to yield new filter parameters $A_n^{(i+1)}$ and $B_n^{(i+1)}$ as indicated by the following mathematical expressions:

$$A_n^{(i+1)}=A_n^{(i)}+\Delta E(iT)Y_n(iT) \quad (10)$$

$$B_n^{(i+1)}=B_n^{(i)}+\Delta E(iT)Y_n(iT-T) \quad (11)$$

where $\Delta E(iT)$ is the attenuated error signal from the attenuator circuit 24, $Y_n(iT)$ is the input signal from the compensator circuit, $Y_n(iT-T)$ is the delayed input signal, $A_n^{(i)}$ and $B_n^{(i)}$ are the old signal values of the accumulator circuits 73 and 84 and $A_n^{(i+1)}$ and $B_n^{(i+1)}$ are the new signal values of the accumulator circuits.

The compensation circuit **16*a* includes only the combination of the first and second multiplier circuits and the accumulator circuit 72. The reason becomes apparent upon examination of the first term within the brackets in Equation (1A). This term is the DC term of the spectrum, and the compensation circuit 16a** (which processes the DC term) has only an $A_0$ gain associated with it.

OPERATION

The frequency domain adaptive equalizer has adjustable parameters, namely $A_0$, $A_i$ and $B_i$, where $i = 1, 2, \ldots, K-½$. These parameters are adjusted recursively by the combination of the summation circuit 18, the comparator circuit 20, the reference signal generator 22, attenuator 24 and the compensation circuits 16a . . . 16c. The adaptive equalizer output signal can be expressed as $$\hat{d}(iT) = A_0^{(i)}Y_0(iT) + \sum_{n=1}^{\frac{K-1}{2}} [A_n^{(i)}Y_n(iT) + B_n^{(i)}Y_n(iT-T)] \quad (12)$$

were $A_0^{(i)}$, $A_n^{(i)}$ and $B_n^{(i)}$ are the compensation circuit parameters at the $i^{th}$ signaling interval, and $Y_n(iT)$ for $n = 0, 1, \ldots,$ K−½ are the individual output signals from the plurality of tuned circuits in second filter section 14.

The comparator circuit 20 compares the adaptive equalizer output signal $\hat{d}(iT)$ with the reference signal $d(it)$ and generates an error signal $E(iT)$ which is the difference between the signals as given in Equation (13).

$$E(iT) = d(iT) - d(iT) \quad (13)$$

Substituting Equation (12) into Equation (13) yields $$E(iT) = d(iT) - A_0^{(i)}Y_0(iT) + \sum_{n=1}^{\frac{K-1}{2}} [A_n^{(i)}Y_n(iT) + B_n^{(i)}Y_n(iT-T)] \quad (14)$$

The parameters $A_0^{(i)}$, $A_n^{(i)}$ and $B_n^{(i)}$ are adjusted in the compensation circuits to minimize the mean square error in accordance with Equations (10) and (11).

The attenuator circuit 24, for example, includes a multiplier circuit 90 having input connections from the comparator circuit 20 and the memory unit 31 and an output connection to the compensation circuits 16a . . . 16c. The error signal $E(iT)$ is multiplied by a scale factor $\Delta$, and the resultant product $\Delta E(iT)$ is directed to the compensation circuits to determine the parameters $A_o$, $A_n$ and $B_n$.

The scale factor $\Delta$ is chosen small enough to insure that the gains are optimum and that the fluctuations about the optimum are small. The value of $\Delta$ determines the rate of convergence of the filter parameters $A_n$ and $B_n$ to their optimum values and the amount of fluctuation noise of the gains about their optimum values. When $\Delta$ is too small, the mean square value of the fluctuation noise (which is proportional to the scaling factor $\Delta$) is also small. However, the rate of convergence is slow. Hence the choice of the scaling factor $\Delta$ involves a compromise between a reasonable rate of convergence and a reasonable means square value of fluctuation noise. A typical value of $\Delta$ for telephone channel application is 0.0001. For further theoretical information concerning the scale factor $\Delta$, see the article entitled "An Adaptive Receiver for Digital Signaling Through Channels with Intersymbol Interference," IEEE Transactions on Information Theory, Vol. IT-15, No. 4, pp. 484–497, July 1969.

As stated hereinabove, the reference signal generator 22 generates the reference signal $d(iT)$ to which the received signal $\hat{d}(iT)$ is compared. The design of a reference signal generator 22 is well within the purview of one skilled in the art. For example, the reference signal generator 22 may include a plurality of oscillators tuned to discrete frequencies across the band of interest and corresponding in frequency to the test signal. The output connections of the oscillators are summed in a resistive divider and the composite signal directed through an A/D converter to the summation circuit 20.

What has been shown and described is a frequency domain adaptive equalizer having automatically adjustable parameters to compensate for distortions in a transmission path. Various modifications, such as adding a tuned circuit having a resonant frequency $f = 1/2T$ to the second filter section 14 and making $K$ an even integer to implement the filter described in Equation (1A), may be made therein without departing from the invention as defined by the appended claims.

What is claimed is:

1. A frequency domain adaptive equalizer comprising: first filter means having a plurality of periodically spaced zeros in its transfer characteristics;
   second filter means coupled to said first filter means and including a plurality of tuned circuits, each of said tuned circuits having a predetermined number of poles in its transfer characteristics, the poles of each of said tuned circuits being coincident in frequency with a separate one of said plurality of periodically spaced zeros of said first filter means;
   a like plurality of compensation means, each having an input connection coupled to a separate one of said plurality of tuned circuits, an output connection and a control terminal, each of said compensation circuits being operative in response to a predetermined signal at its control terminal to change its transfer characteristics;
   summation means having an input connection coupled to each of the plurality of compensation means and an output connection and being operative to sum signals at its input connection to form a composite signal at its output connection; and
   feedback means having an input connection coupled to the output connection of said summation means, an output connection coupled to the control terminal of each of said plurality of compensation means and a reference signal source and being operative to generate said predetermined signal at its output connection, said predetermined signal being proportional to the difference between a reference signal from said reference signal source and a signal at the input connection of said feedback means.

2. A frequency domain adaptive equalizer according to claim 1 wherein said first filter means includes:
   a delay circuit having an input connection connected to the input connection of said first filter means and an output connection and being operative to delay a signal being transferred from its input connection to its output connection;
   a multiplier means having an input connection connected to the output connection of said delay circuit and an output connection and being operative to multiply the delayed signal from said delay circuit at its input connection by a predetermined factor to form a delayed product signal; and
   a summation circuit having a first input connection connected to the input connection of said delay circuit, a second input connection connected to the output connection of said multiplier circuit and an output connection coupled to said second filter means and being operative to sum input signals to said first filter means with the delayed product signal from said summation circuit.

3. A frequency domain adaptive equalizer according to claim 1 wherein
   one of said plurality of tuned circuits includes
   a first summation circuit having a first input connection coupled to the output connection of said first filter means, a second input connection and an output connection coupled to one of said plurality of compensation means and being operative to add signals at its first and second input connections, a delay circuit having an input connection connected to the output connection of said first summation circuit and an output connection and being operative to delay for a predetermined time interval a signal at its input connection, and a first multiplier circuit having an input connection connected to the output connection of said delay circuit and an output connection connected to the second input connection of said first summation circuit and being operative to multiply an output signal from said delay circuit by a first predetermined factor to form a first delayed product signal, said first delayed product signal being added to an input signal at the first input terminal of said first summation circuit; and each of the remaining ones of said plurality of tuned circuits include a second summation circuit having a first input connection to the output connection of said first filter connection, second and third input connections and an output connection connected to a separate one of the remaining ones of said plurality of compensation circuits and being operative to add signals at its three input connections and direct the resultant sum signal to said separate one of said remaining ones of said plurality of compensation circuits, a second delay circuit having an input connection connected to the output connection of said second summation circuit and an output connection and being operative to delay a signal at its input connection for said predetermined time interval, a second multiplier circuit having an input connection connected to the output connection of said second delay circuit and an output connection connected to the second input connection of said second summation circuit and being operative to multiply a signal at its input connection by a separate predetermined factor to form a second delayed product signal, a third delay circuit having an input connection connected to the output connection of said second delay circuit and an output connection and being operative to delay the delayed signal from said second delay circuit an amount substantially equal to said predetermined time interval, and a third multiplier circuit having an input connection connected to the output connection of said third delay circuit and an output connection connected to the third input connection of said second summation circuit and being operative to multiply the twice delayed signal from said third delay circuit by a second predetermined factor whereby each of the remaining ones of said plurality of tuned circuits is adapted to process a portion of an output signal determined by the predetermined factor of said second multiplier circuit.

4. A frequency domain adaptive equalizer according to claim 1 wherein one of said plurality of compensation means includes an input terminal coupled to a certain one of said plurality of tuned circuits a first multiplier circuit having a first input connection connected to said input terminal, a second input terminal coupled to the output connection of said feedback means and an output connection, and being operative to multiply signals present at its first and second input connections to form a first product signal at its output connection, accumulator means having an input connection connected to the output connection of said first multiplier circuit and an output connection, and being operative to accumulate the sum of the product signals from said first multiplier circuit, and a second multiplier circuit having a first input connection connected to said input terminal, a second input connection connected to the output connection of said accumulator means, and an output connection connected to said summation means and being adaptive to multiply an input signal at said input terminal by an accumulated product signal from said accumulator means to thereby generate one input signal to said summation means; and each of the remaining ones of said plurality of compensation means include an input terminal coupled to a separate one of the remaining ones of the plurality of tuned circuits, a first summation circuit having an output connection coupled to said summation means and a first and second input connection and being operative to add signals at its first and second input connection, a first adjusting means having a first input connection connected to said to said input terminal, a second input connection coupled to the output connection of said feedback means, and an output connection connected to the first input connection of said first summation circuit, and being operative in response to said predetermined signal from said feedback means to adjust the signal level at its output connection in a direction to minimize said predetermined signal, a delay circuit having an input connection connected to said input terminal and an output connection and being operative to delay a signal at its input connection for a predetermined time interval, and second adjusting means having a first input connection connected to the output connection of said delay circuit, a second input connection coupled to the output connection of said feedback means, and an output connection connected to the second input connection of said first summation circuit and being operative in response to said predetermined signal from said feedback means to adjust the level of a signal at its output connection in a direction so as to minimize said predetermined signal, whereby a signal level at the input terminal of said compensating means is adjusted by said first adjusting means and added to an adjusted delayed signal from said second adjusting means.

5. A frequency domain adaptive equalizer according to claim 4 wherein said first adjusting means of each of the remaining ones of said plurality of compensated means includes a third multiplier circuit having a first input connection connected to the input terminal, a second input connection coupled to the output connection of said feedback means and an output connection and being operative to generate a third product signal from a signal at its first input connection and said predetermined signal from said feedback means, a first accumulator means having an input connection connected to the output connection of said third multiplier circuit and an output connection and being operative to add the previous third product signal from said second multiplier circuit to the most recent third product signal to form a sum signal, and a fourth multiplier circuit having a first input connection connected to said input terminal and a second input connection connected to the output of said first accumulator means and an output connection connected to said first summation circuit of said compensation means, and being operative to multiply an input signal at said input terminal by the accumulated sum signal from said accumulator means to form a fourth product signal; and said second adjusting means of each of the remaining ones of said plurality of compensation means includes a fifth multiplier circuit having a first input connected to the output connection of said delay circuit of said compensation means, a second input connection coupled to the output connection of said feedback means and an output connection and being operative to multiply an input signal at its first input connection by said predetermined signal from said feedback means to form a fifth product signal, a second accumulator means having an input connection connected to the output connection of said fifth multiplier circuit and an output connection and being operative to add the previous fifth product signal from said fourth multiplier circuit to the most recent fifth product signal to form a second accumulated sum signal, and a sixth multiplier circuit having a first input connection connected to the output connection of said delay circuit, a second input connection connected to the output connection of said second accumulator means and an output connection connected to the second input connection of said first summation circuit, and being operative to multiply a delayed signal from said delay circuit by an accumulated fifth product signal from said second accumulating means to form a sixth product signal, said fourth product signal and said sixth product signal being the adjusted signals from said first and second adjusting means respectively.

6. In communication apparatus including a transmission path having amplitude and phase characteristics a system for compensating for unwanted distortions in the amplitude and phase characteristics of the transmission path including:

a signal source coupled to one end of the transmission path and being operative to generate a first composite signal including a predetermined number of discrete frequency signals, each discrete frequency signal having a predetermined amplitude;

first filter means having an input connection coupled to the other end of the transmission path, and output connection and a plurality of periodically spaced zeros in its transfer characteristics;

second filter means having an input connection coupled to the output connection of said first filter means and including a plurality of tuned circuits, each of said plurality of tuned circuits having a predetermined number of poles in its transfer characteristics, the poles of each of said tuned circuits being coincident in frequency with a separate one of said plurality of periodically spaced zeros of said first filter means, said first and second filter means being operative to separate the composite signal from said signal source into its discrete frequency component signals;

plurality of compensation means, each one having an input connection coupled to a separate one of said plurality of tuned circuits, an output connection and a control terminal and being operative in response to a predetermined signal at its control terminal to adjust the combined transfer characteristics of the compensation means and its associated tuned circuit;

summation means having an input connection coupled to the output connection of each of said plurality of compensation means and an output connection and being operative to add the output signals from the plurality of compensation means to form a second composite signal including the discrete frequency signals of said first composite signal after said discrete frequency signals have been propagated along said transmission path; and feedback means having an input connection coupled to the output connection of said summation means, an output connection coupled to the control terminal of each of said plurality of compensation means, and including a reference signal having said predetermined number of discrete frequency signals, said feedback means being operative to compare the second composite signal from said summation means to the third composite signal from said reference signal source to generate said predetermined signal at the control terminals of each of said compensation means, each of said compensation means operative in response to said predetermined signal to adjust its transfer characteristics in a direction to minimize said predetermined signal.

7. A system according to claim 6 including an analog to digital convertor coupled between the transmission path and said first filter means and being operative to convert the first composite signal to digital format having a predetermined sampling interval associated therewith.

8. A system according to claim 7 wherein said first filter means includes:

a first delay circuit having an input connection coupled to said analog to digital convertor and an output connection and being operative to delay each output sample of the output signal of said analog to digital convertor by one sample interval; and a first multiplier circuit having an input connection connected to the output connection of said first delay circuit and an output connection and being operative to multiply each delayed sample by a first predetermined factor to form a first product signal, a first summation circuit having a first input connection connected to the input connection of said first delay circuit, a second input connection connected to the output connection of said first multiplier circuit and an output connection and being operative to add an input sample signal from said analog to digital convertor to the first delayed product signal to thereby establish a plurality of periodically spaced zeros in the frequency transfer characteristics of said first filter means.

9. A system according to claim 8 wherein one of said tuned circuits includes a second summation circuit having a first input connection coupled to the output connection of said first filter means, a second input connection and an output connection, a second delay circuit having an input connection connected to the output connection of said second summation circuit and an output connection and being operative to delay for one sampling interval an output signal from said second summation circuit, and a second multiplier circuit having an input connection connected to the output connection of said second delay circuit and an output connection connected to the second input connection of said second summation circuit and being operative to multiply a delayed sample from said second delay circuit by a second predetermined factor which determines the resonant frequency of said one of said tuned circuits to form a second product signal, said second summation circuit being operative to add to said second product signal the most recent sample of the discrete frequency from said signal source corresponding to said resonant frequency signal; and each of the remaining tuned circuits includes a third summation circuit having first, second and third input connections and an output connection, said first input connection being coupled to the output connection of said first filter section, a third delay circuit having an input connection connected to the output connection of said third summation circuit and an output connection and being operative to delay an output signal from said third summation circuit by one sample interval, a third multiplier circuit having an input connection connected to the output connection of said third delay circuit and an output connection connected to the second input connection of said third summation circuit and being operative to generate a third product signal by multiplying the delayed signal from said third delay circuit by a third predetermined factor which determines the resonant frequency of said tuned circuit, a fourth delay circuit having an input connection connected to the output connection of said third delay circuit and an output connection and being operative to delay by one sample interval the delayed output signal from said third delay circuit, and a fifth multiplier circuit having an input connection connected to the output connection of said fourth delay circuit and an output connection to the third input connection of said third summation circuit and being operative to generate a fourth product signal by multiplying the delayed output signal from said fourth delay circuit by a fifth predetermined factor, whereby each discrete frequency signal of said first composite signal is directed through the particular one of said plurality of tuned circuits corresponding to the discrete frequency value.

10. A system according to claim 9 wherein one of said plurality of compensation means includes a sixth multiplier circuit having a first input connection coupled to said one of said plurality of tuned circuits, a second input connection coupled to the control terminal of said one of said compensation means and being operative to generate a sixth product signal by multiplying the output signal from said one of said plurality of tuned circuits by said predetermined signal from said feedback means, first accumulator means having an input connection connected to said sixth multiplier circuit and an output connection and being operative to accumulate the sixth product signals from said sixth multiplier circuits, and a seventh multiplier circuit having a first input connection coupled to said one of said plurality of tuned circuits, a second input connection connected to the output connection of said first accumulator means and an output connection coupled to said summation means and being operative to generate a seventh product signal by multiplying the cummulative sixth product signals from the previous sample interval by the present sample signal from said one of said tuned circuits; and each of the remaining ones of said plurality of compensation means includes an eighth multiplier circuit having a first input connection coupled to the associated tuned circuit of said compensation means, a second input connection coupled to said feedback means and being operative to generate an eighth product signal by multiplying the output signal from its associated tuned circuit by the predetermined signal from said feedback means, second accumulator means having an input connection connected to the output connection of said eighth multiplier circuit and an output connection and being operative to accumulate the eighth product signals from said eighth multiplier circuit to generate a first adjustable parameter, a ninth multiplier circuit having a first input connection connected to the associated tuned circuit, a second input connection connected to the output connection of said second accumulator means and an output connection and being operative to multiply the output signal from said associated tuned circuit by said first adjustable parameter from said second accumulator means, a tenth multiplier circuit having a first input connection connected to the output connection of said fifth delay circuit, a second input connection coupled to said feedback means and an output connection and being operative to generate a tenth product signal by multiplying the delayed output signal from said fifth delay circuit by the predetermined signal from said feedback means, a third accumulator means having an input connection connected to the output connection of said tenth multiplier circuit and an output connection and being operative to accumulate the tenth product signals from said tenth multiplier circuit to generate a second adjustable parameter, an eleventh multiplier circuit having a first input connection connected to said fifth delay circuit and a second output connection connected to said third accumulator means and an output connection and being operative to generate an eleventh product signal by multiplying a delayed signal from said fifth delay circuit by the adjustable parameter from said third accumulator means, and a fourth summation circuit having a first input connection connected to the output connection of said ninth multiplier circuit, a second input connection connected to said eleventh multiplier circuit and an output connection coupled to said summation means and being operative to sum the ninth and eleventh product signals.

* * * * *